(12) United States Patent
Tan

(10) Patent No.: US 12,413,133 B2
(45) Date of Patent: Sep. 9, 2025

(54) SWITCHING REGULATOR WITH ADJUSTABLE ON-TIME

(71) Applicant: Renesas Electronics America Inc., Milpitas, CA (US)

(72) Inventor: Zheyuan Tan, San Jose, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 317 days.

(21) Appl. No.: 18/162,890

(22) Filed: Feb. 1, 2023

(65) Prior Publication Data

US 2024/0258918 A1 Aug. 1, 2024

(51) Int. Cl.
*H02M 3/158* (2006.01)
*H02M 1/00* (2006.01)
*H02M 3/157* (2006.01)

(52) U.S. Cl.
CPC ......... *H02M 1/0032* (2021.05); *H02M 3/157* (2013.01); *H02M 3/158* (2013.01)

(58) Field of Classification Search
CPC .......................... H02M 1/0032; H02M 1/0035
See application file for complete search history.

(56) References Cited

U.S. PATENT DOCUMENTS

| 11,837,960 | B2 * | 12/2023 | Cai | ..................... | H02M 3/1586 |
| 2015/0091544 | A1 * | 4/2015 | Jayaraj | .................. | H02M 3/156 |
| | | | | | 323/284 |
| 2023/0096741 | A1 * | 3/2023 | Cai | ...................... | H02M 3/157 |
| | | | | | 323/271 |

* cited by examiner

*Primary Examiner* — Alex Torres-Rivera
(74) *Attorney, Agent, or Firm* — SCULLY, SCOTT, MURPHY & PRESSER, P.C.

(57) ABSTRACT

A switching converter with adjustable on-time is presented. The switching converter includes an inductor coupled to a power switch; a pulse generator generating a pulsed signal to switch the power switch and a controller. The pulsed signal has an on-time adjustable between a first value and a second value, the first value being shorter than the second value. The controller identifies a mode of operation between a continuous conduction mode and a discontinuous conduction mode and sets the on-time to the second value when a continuous conduction mode is identified. The controller also measures a duration between successive inductor current pulses, compares the duration with a first threshold value and maintains the on-time to the second value as long as the duration is less than the first threshold value. When the duration increases above the first threshold value the controller sets the on-time to the first value.

15 Claims, 16 Drawing Sheets

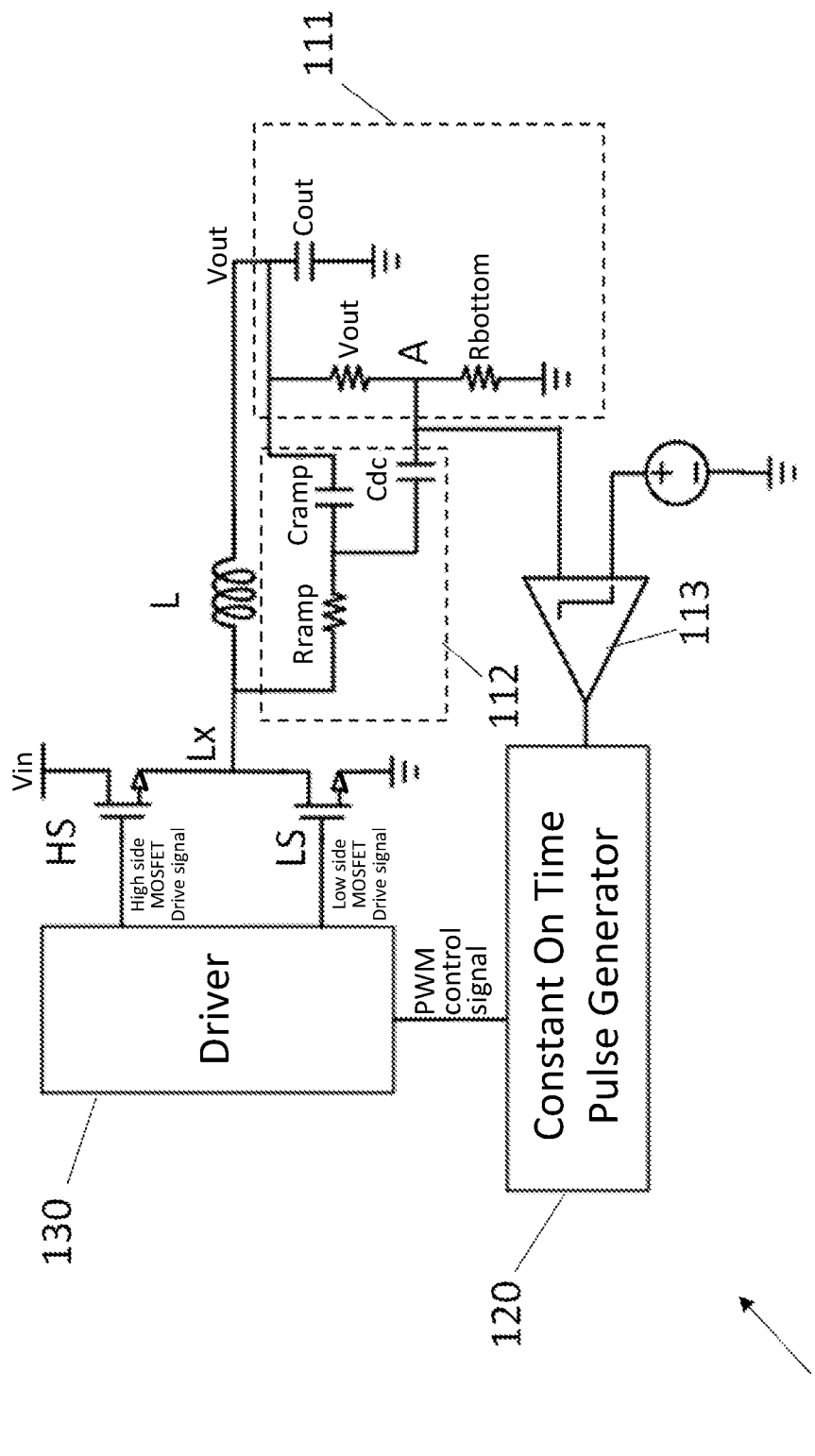
Figure 1A — Prior Art

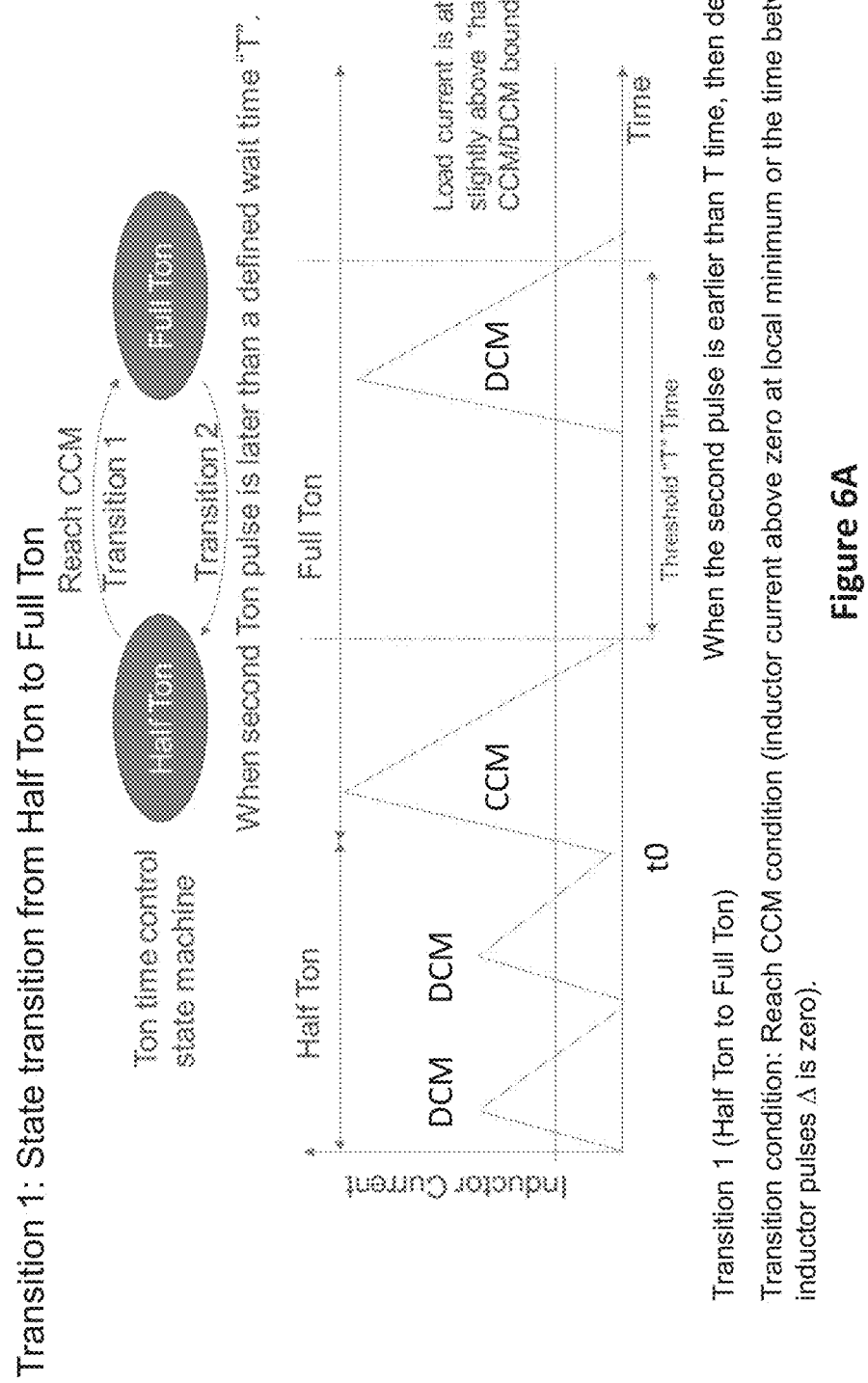

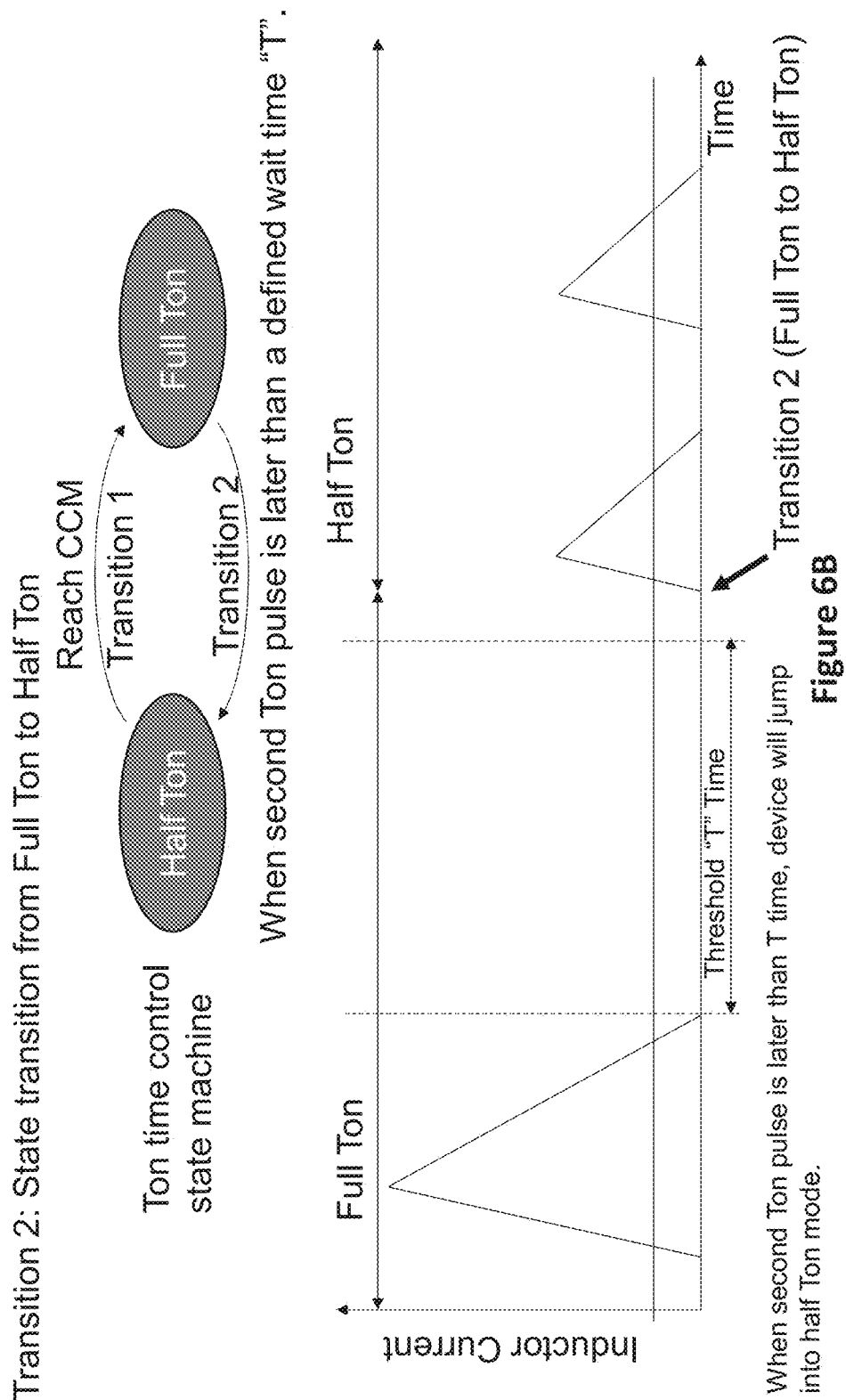

At t', regulator reaches CCM in half Ton, and transits into full Ton and stays in DCM.

SWITCHING REGULATOR WITH ADJUSTABLE ON-TIME

TECHNICAL FIELD

The present disclosure relates to a switching regulator with adjustable on-time. In particular, the present disclosure relates to a switching regulator with reduced output ripples.

BACKGROUND

Switching regulators such as buck regulators are used in many different applications for providing a desired output (current or voltage) to a chosen circuit.

Constant-on-time regulators (COT) have several advantages over traditional current and voltage mode control regulators including faster transient response, higher efficiency, and a relatively simpler design. In a COT regulator the output voltage is sensed via feedback resistors. The output ripple voltage is compared with a reference voltage to generate a fixed on-time pulse Ton to turn on the high-side power switch. When the on-time pulse terminates, the high-side power switch turns off and the low-side turns on. Depending on the load, COT regulators can operate in a discontinuous conduction mode (DCM) and or a continuous conduction mode (CCM). In a conventional COT regulator the value of the on-time pulse Ton remains the same in both DCM and CCM modes of operation. This results in an increased output ripple when the regulator is operating in DCM.

It is an object of the disclosure to address one or more of the above mentioned limitations.

SUMMARY

According to a first aspect of the disclosure, there is provided a method of controlling a switching converter comprising an inductor and a power switch, the method comprising
   generating a pulsed signal to switch the power switch, wherein the pulsed signal has an on-time adjustable between a first value and a second value, the first value being shorter than the second value;
   identifying a mode of operation between a continuous conduction mode and a discontinuous conduction mode;
   when a continuous conduction mode is identified, setting the on-time to the second value;
   measuring a duration between successive inductor current pulses and comparing the duration with a first threshold value;
   maintaining the on-time to the second value as long as the duration is less than the first threshold value; and
   setting the on-time to the first value when the duration increases above the first threshold value.

Optionally, identifying a mode of operation comprises sensing a valley inductor current value, and wherein when the valley inductor current is positive the continuous conduction mode is identified and when the valley inductor current is zero a discontinuous conduction mode is identified.

Optionally, identifying a mode of operation comprises comparing the duration between successive inductor current pulses with a second threshold value and identifying the continuous conduction mode when the duration reaches a value that is less than the second threshold value.

Optionally, the second threshold value is less than about 100 nanoseconds.

Optionally, the first threshold value is greater than a switch period equal to the sum of the on time and the off time of the power switch.

Optionally, wherein the switch period is calculated with the on-time having the second value.

Optionally, the first value of the on-time is half the second value.

Optionally, the duration between successive pulses is calculated between an end of a first pulse and a start of a second pulse.

According to a second aspect of the disclosure, there is provided a switching converter comprising an inductor coupled to a power switch; a pulse generator adapted to generate a pulsed signal to switch the power switch, wherein the pulsed signal has an on-time adjustable between a first value and a second value, the first value being shorter than the second value; and a controller configured
   to identify a mode of operation between a continuous conduction mode and a discontinuous conduction mode;
   to set the on-time to the second value when a continuous conduction mode is identified;
   to measure a duration between successive inductor current pulses and compare the duration with a first threshold value;
   to maintain the on-time to the second value as long as the duration is less than the first threshold value; and
   to set the on-time to the first value when the duration increases above the first threshold value.

Optionally, the converter is adapted to generate a first logic signal indicative of a continuous conduction mode condition, and a second logic signal indicative of a tri-state phase.

Optionally, the tri-state phase occurs in discontinuous conduction mode when a high side power switch and a low side power switch of the switching converter are both switched off.

Optionally, the controller comprises a pulse width comparator adapted to receive the second logic signal and to generate a condition signal, wherein when the tri-state phase is greater than the first threshold value, the condition signal is in a first state, and when the tri-state phase is less than the first threshold value, the condition signal is in a second state.

Optionally, the controller comprises a memory device coupled to the pulse width comparator, the memory device having a first input for receiving the first logic signal, a second input for receiving the condition signal and an output for providing a selection signal to select the first value or the second value of the on-time.

For example the memory device may be a flip flop.

Optionally, wherein the switching converter is a buck converter or a boost converter.

Optionally, wherein the switching converter is a constant on time converter.

The options described with respect to the first aspect of the disclosure are also common to the second aspect of the disclosure.

DESCRIPTION OF THE DRAWINGS

The disclosure is described in further detail below by way of example and with reference to the accompanying drawings, in which:

FIG. 1A is a circuit diagram of a constant-on-time buck regulator according to the prior art;

FIG. 2 is a plot showing the inductor current as a function of time when Ton is directly controlled by the mode of operation that the regulator is in;

FIG. 6A is a plot showing the value of the inductor current for the circuit of FIG. 5 for the condition of transition 1;

FIG. 6B is another plot showing the value of the inductor current for the circuit of FIG. 5 for the condition of transition 2;

DESCRIPTION

Figure 1B:
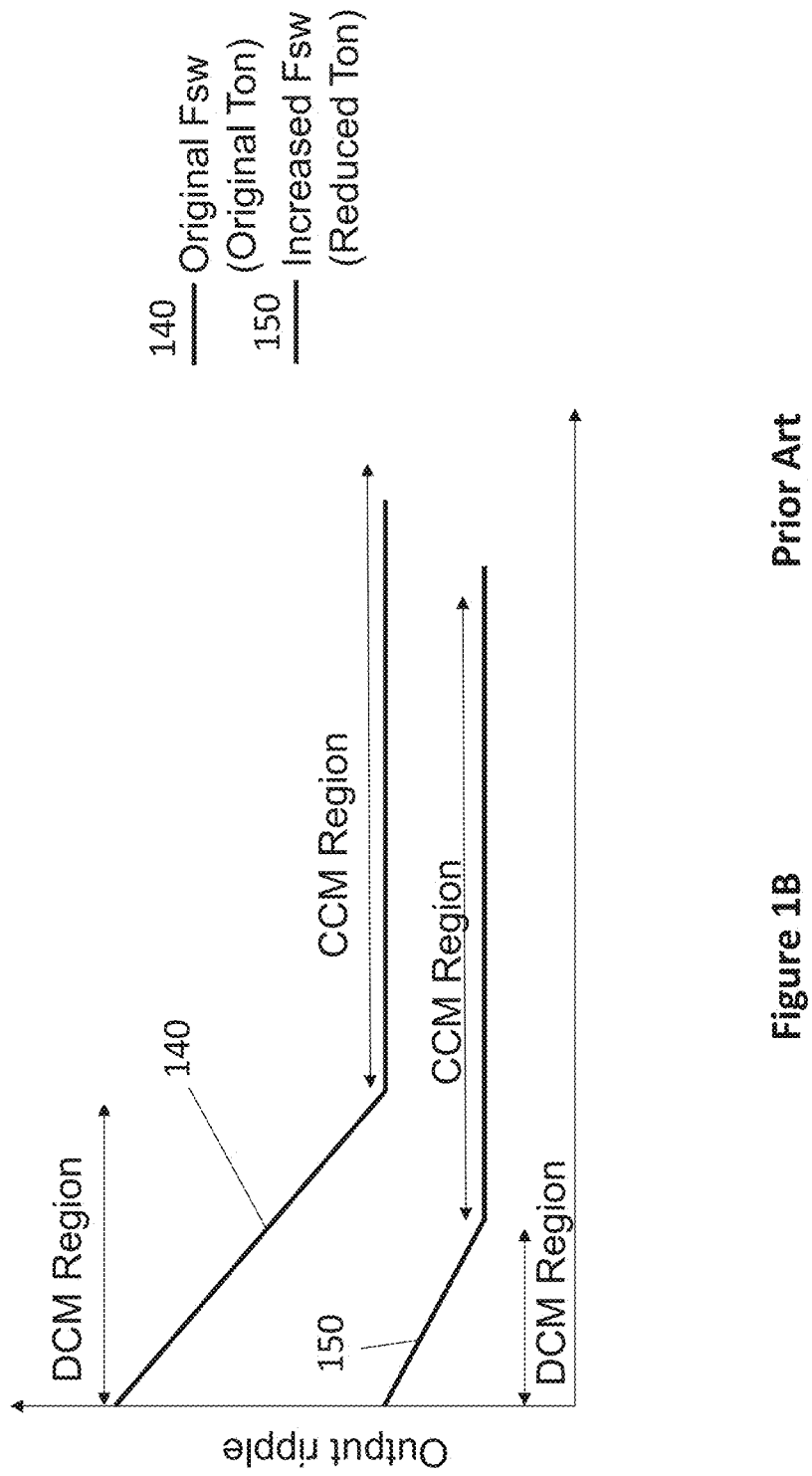
FIG. 1B is a plot showing the output ripple as a function of output current with different values of Ton for regulator of FIG. 1.

FIG. 1A illustrates a circuit diagram of a constant-on-time buck regulator according to the prior art. The buck regulator 100 includes a high side power switch HS, a low side power switch LS coupled to an inductor L at a switching node LX. The inductor L is coupled to an output stage 111 formed of an output capacitor Cout, and a resistive ladder having a first resistance Rtop and a second resistance Rbottom coupled at node A. A ramp injection circuit 112 is coupled between the switching node Lx and the output stage 111. This ramp injection circuit 112 is optional depending on the output capacitor Cout employed in the circuit. If Cout has a high equivalent series resistance (ESR) then the ramp injection circuit 112 can be omitted.

A comparator 113 has a first input coupled to node A and a second input coupled to a reference voltage generator. The output of the comparator 113 is coupled to a pulse generator 120. A driver 130 coupled to the pulse generator 120 is provided to drive the HS and LS power switches. The switches may be metal-oxide semiconductor field-effect transistor (MOSFET).

In operation, the comparator 113 determines when the output voltage falls below a reference voltage. The pulse generator receives the output of the comparator 113 and produces a control signal for the driver 130 to control the high-side and low-side switches. The control signal may be a pulse width modulation PWM signal.

The buck regulator 100 has two modes of operation: a discontinuous conduction mode (DCM) and a continuous conduction mode (CCM).

The high side and low side switches are turned ON/OFF alternately. When the high side power switch is ON (Ton phase) the inductor current IL increases, and when the high side power switch is OFF (Toff phase) the inductor current decreases. In the discontinuous mode the inductor current IL remains zero for a period of time, $\Delta$, between Toff and the next Ton, so that the inductor current is not continuous. The period $\Delta$ may be referred to as tri-state. In contrast, in the continuous mode the inductor current flows continuously. If the inductor L is not fully discharged before the power switches transition between the Ton and Toff phases, then the inductor current is never zero and the regulator is operating in CCM. If, however, there is enough time during the Toff phase for the inductor to become discharged, then the inductor current will reach zero and this is DCM operation. A combination of CCM and DCM operation is preferred such that the regulator can work under both light-load current conditions (DCM) and high-load current conditions (CCM). In a conventional COT regulator the value of Ton remains the same in both CDM and CCM modes of operation. This results in an increased output ripple when the regulator is operating in DCM.

FIG. 1B shows the output ripple as a function of output current in the different modes of operation for the constant-on-time buck regulator of FIG. 1 for different values of Ton, (line 150 for increased Ton and line 140 for reduced Ton). When the regulator is operating in DCM mode, with original Ton the output ripple increases, which is undesirable. Therefore, lower values of Ton during DCM operation would be preferred in order to reduce this output ripple. In CCM operation a reduced Ton can impact the efficiency of operation due to increased switching loss, as a reduced Ton equates to a higher switching frequency for the high-side and low-side switches.

Figure 2:
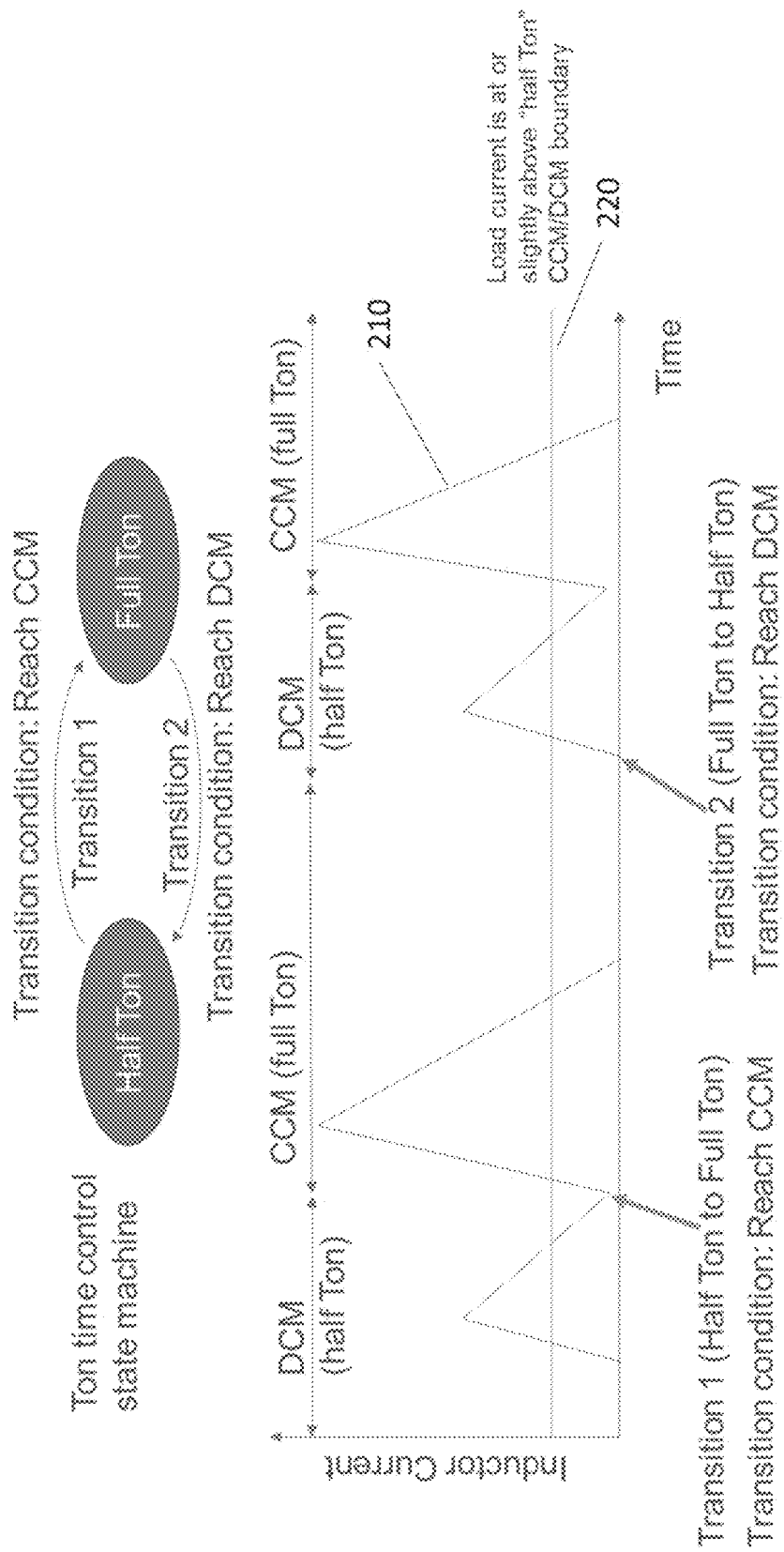

FIG. 2 is a plot showing the value of the inductor current 210 as a function of time using an alternative control method. In this approach Ton is controlled by the mode of operation that the regulator is in.

At the starting point of a COT pulse (inductor current ramping up period) if the inductor current is above zero, the device is in CCM; if it is at zero, the device is in DCM. This definition assumes that the low side power switch (MOSFET) is in diode emulation mode (low side MOSFET would turn off when inductor current reached zero).

In this thought experiment the regulator would transition from using DCM half Ton to CCM full Ton (transition 1) and then from CCM full Ton to DCM half Ton (transition 2). The line 220 represents an average current boundary condition between DCM and CCM operation at half Ton. When the load current ($I_{Load}$) is close to the boundary condition, the regulator will enter a phase of uncontrolled switching back and forth between CCM and DCM operation, referred to as chattering. This reduces the efficiency of the regulator.

Figure 3:
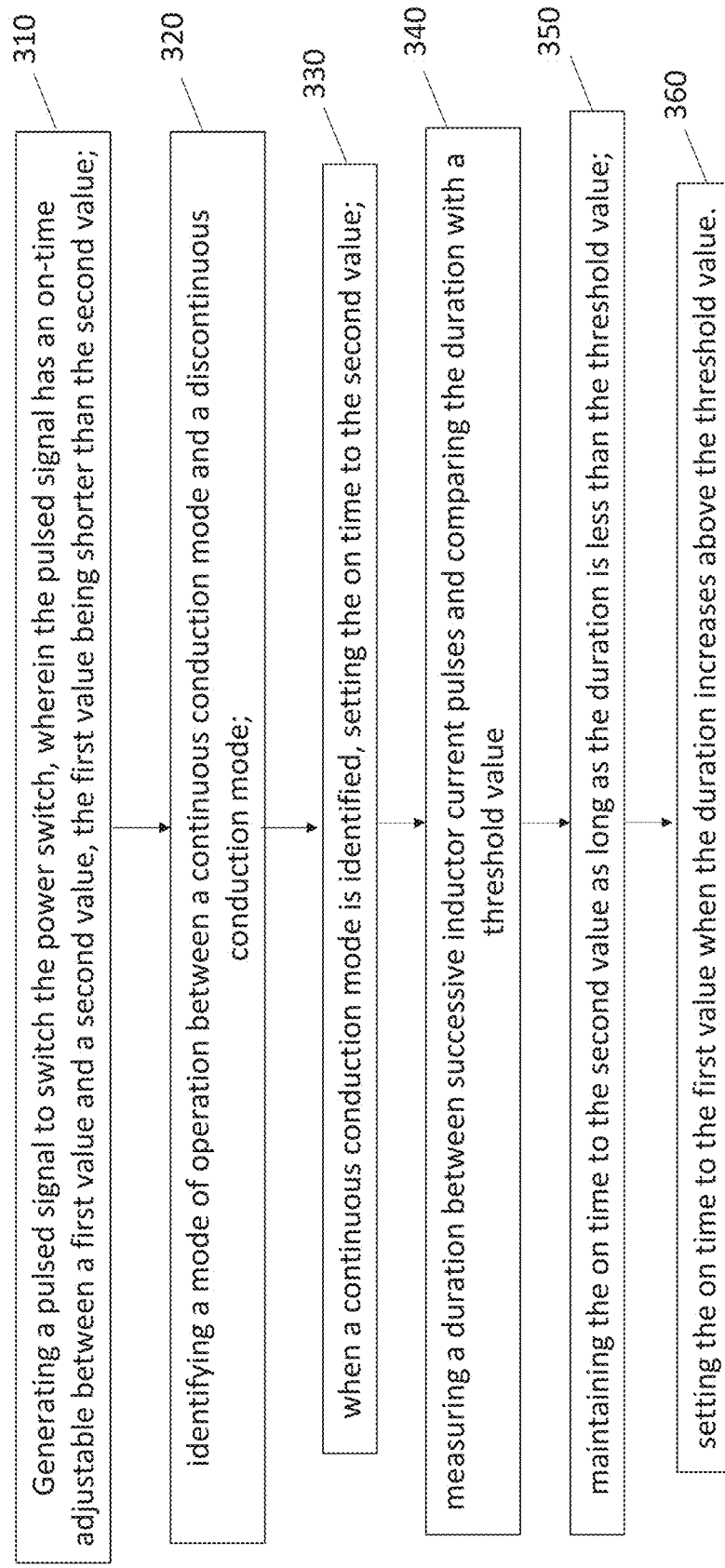
FIG. 3 is a flow chart of a method for controlling a switching converter according to the disclosure.

FIG. 3 is a flow chart of a method of controlling a switching converter comprising an inductor and a power switch.

At step 310 a pulse signal is generated to switch the power switch. The pulse signal has an adjustable on-time (Ton) between a first value and a second value, the first value being shorter than the second value. For instance the first value may be half the second value such as if the second value is Ton, the first value is half Ton.

At step 320 a mode of operation is identified between a continuous conduction mode CCM and a discontinuous conduction mode DCM.

The mode of operation may be identified by sensing a valley inductor current value, that is a local minimum value.

When the valley inductor current is positive the CCM mode is identified and when the valley inductor current is zero a DCM mode is identified.

The mode of operation may be identified in different ways. If the inductor current reaches a zero value at the end of a switch off period of the high side power switch, then the converter operates in DCM mode, otherwise if inductor current remains positive the converter operates in a CCM mode.

Alternatively, the duration between successive inductor current pulses may be compared with a low threshold value. For instance the low threshold value may be less than about 100 nanoseconds. When the duration reaches a value that is less than the low threshold value, the CCM mode of operation is identified.

At step 330 when a continuous conduction mode is identified, the on-time is set to the second value.

At step 340, a duration between successive inductor current pulses is measured and compared with a first threshold value.

At step 350 the on-time is maintained to the second value as long as the duration is less than the first threshold value.

At step 360 the on-time is set to the first value when the duration increases above the first threshold value.

The first threshold value may be greater than the switch period. The switch period may be defined as the sum of the on time and the off time of the power switch, with the on time of the switching period having the second value (full Ton).

In a first scenario the switching converter is operating in DCM mode with the on-time set to the second value, for example full Ton, with a decreasing load current. In this case the on-time may be set to first value, for example half Ton when the duration between inductor pulses increases above the first threshold value.

In a second scenario the switching converter is operating in DCM mode with the on-time set to the first value, for example half Ton, with an increasing load current. In this case the switching converter operates in CCM mode when the duration between successive inductor current pulses is zero and the on-time is set to the second value, for instance full Ton.

The proposed approach permits to reduce output ripples by maintaining a shorter Ton in the DCM region of operation.

Figure 4:
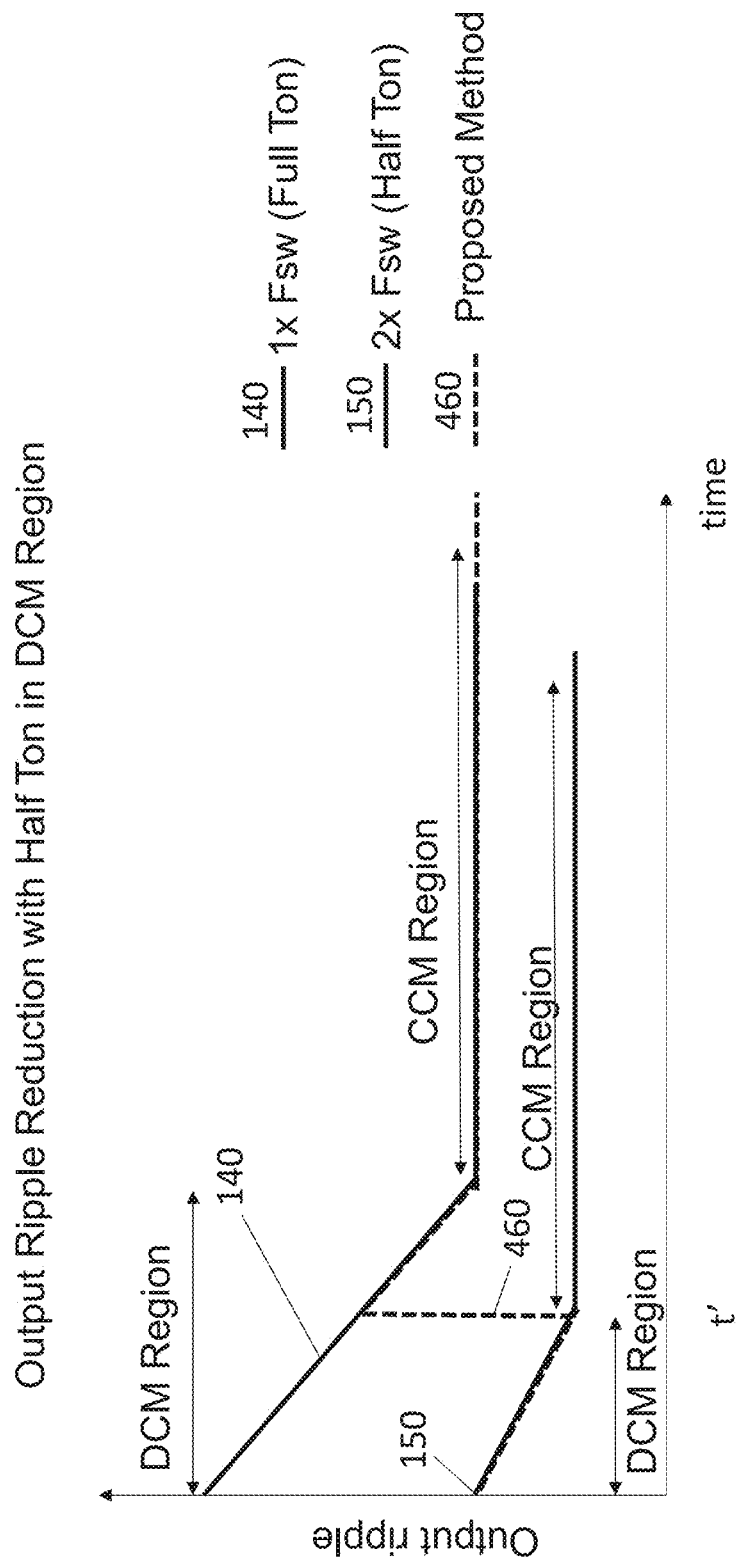
FIG. 4 is a plot showing the output ripple as a function of output current using the method of FIG. 3, compared with the method of the prior art as shown in FIG. 1B.

FIG. 4 is a plot showing the output ripple as a function of output current using the method of FIG. 3, compared with the method of the prior art as shown in FIG. 1B. The proposed method permits to lower output ripples in DCM mode (for instance using half Ton) while improving efficiency in CCM mode (for instance using full Ton). The dash line 460 shows that at half Ton in DCM, when output current is 0 A, the ripple is calculated the same as Full Ton at CCM. With this proposed approach, at 0 A, the device would work at half Ton; and when current increases to CCM region at half ton, the device would jump into Full Ton in DCM region (see time t'); and if the current increases further, the device would go into Full Ton in CCM region.

Figure 5:
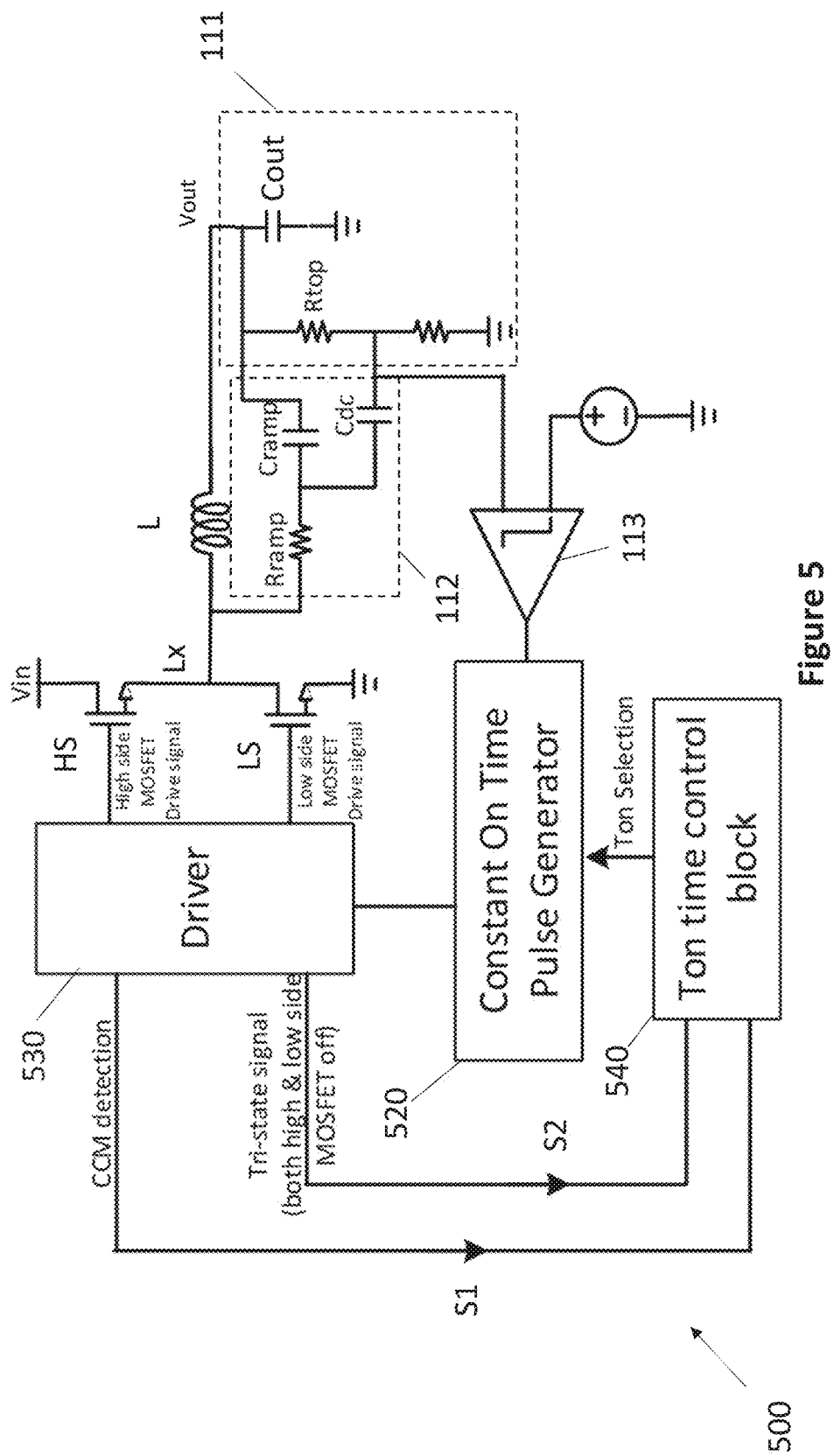
FIG. 5 is a diagram of a constant-on-time buck regulator for implementing the method of FIG. 3.

FIG. 5 is a circuit diagram of a constant-on-time buck regulator for implementing the method of FIG. 3.

The circuit of FIG. 5 shares similar components to those illustrated in the circuit of FIG. 1. The same reference numerals have been used to represent corresponding components and their description will not be repeated for sake of brevity. In this circuit, and additional controller 540 is provided for sending a control signal to the on time pulse generator 520. As previously mentioned, the ramp injection circuit 112 is optional.

The output of the comparator 113 is coupled to the pulse generator 520. The driver 530 has two additional outputs for sending two signals to the controller 540: a first signal S1 referred to as CCM detection signal, and a second signal S2 referred to as tri-state signal. The signal S1 may be a logic signal indicative of the mode of operation of the regulator (CCM or DCM). The signal S2 may be a logic signal indicative of whether the regulator is in the tri-state occurring in DCM mode when both the high side power switch and the low side power switch are turned off.

In operation when the output voltage falls below a reference voltage value the comparator 113 sends a signal to the pulse generator 520. The controller 540 also receives the signals S1 and S2 from the driver 530.

The controller 540 compares the duration between successive inductor current pulses, Δ, with a predefined threshold value referred to as wait time T. Then the controller 540 sends a signal to the pulse generator 520 to set the on time to the first value or the second value based on the comparison. The value of the wait time T is determined so as to prevent the regulator chattering between DCM and CCM. The wait time T should be larger than the time between inductor current pulses when the value of the load current is at the DCM/CCM boundary with reduced on-time (see load current i2 in FIG. 7C below). For instance, the threshold time T may be larger than the switching period at full Ton (second value). The switching period equals to the sum of the high side power switch on-time and the low side power switch on-time, or the sum of the high side power switch on time and the high side power switch off time.

When the load current is zero, the regulator operates in DCM with a reduced on-time (for instance half Ton) value. As the load current increases, the pulses in DCM mode become more frequent and eventually two pulses will touch each other, or in other words Δ will be zero. This is when the first transition occurs and the regulator operates in DCM mode with an increased on-time (for instance full Ton). If the current continues to increase, then the regulator will start operating in CCM. The device will continue to use a maximum Ton value whilst the time between inductor current pulses, Δ, remains shorter than the wait time T, even if the operation mode switches back to DCM as the load current reduces. When the time between pulses, Δ, is longer than the wait time, the Ton control block 540 will reduce the value of Ton.

FIG. 6A is a plot showing the value of the inductor current for the circuit shown in FIG. 5. Initially, the regulator is operating in DCM with a reduced value of on-time (half Ton) and there is a time Δ greater than zero between pulses. As the load increases the time between two pulses Δ reduces and becomes zero. The time to marks the point of transition 1 and the controller increases the on-time to full Ton. The system maintains full Ton whilst the time between pulses Δ is shorter than the threshold time T. With this proposed control method, the device will stay at full Ton DCM, when the output load current is constant at the half Ton CCM/DCM boundary.

If the duration between successive inductor current pulses is null (zero), then a continuous conduction mode condition CCM is detected. Another way of detecting a CCM condition may be to identify a valley (local minimum) having an amplitude above zero. In CCM at the starting point of the pulse (inductor current ramping up period) the inductor current is above zero. This is the case at time t0.

FIG. 6B is another plot showing the value of the inductor current for the circuit shown in FIG. 5. The regulator is still operating with an increased on-time (full Ton). However, the time between successive pulses Δ is now longer than the threshold time T. This marks the point of transition 2 and the controller reduces the on-time (half Ton).

Tuning of the value of the time T could help to increase or reduce the hysteresis and avoid chattering between the modes.

Figure 7A:
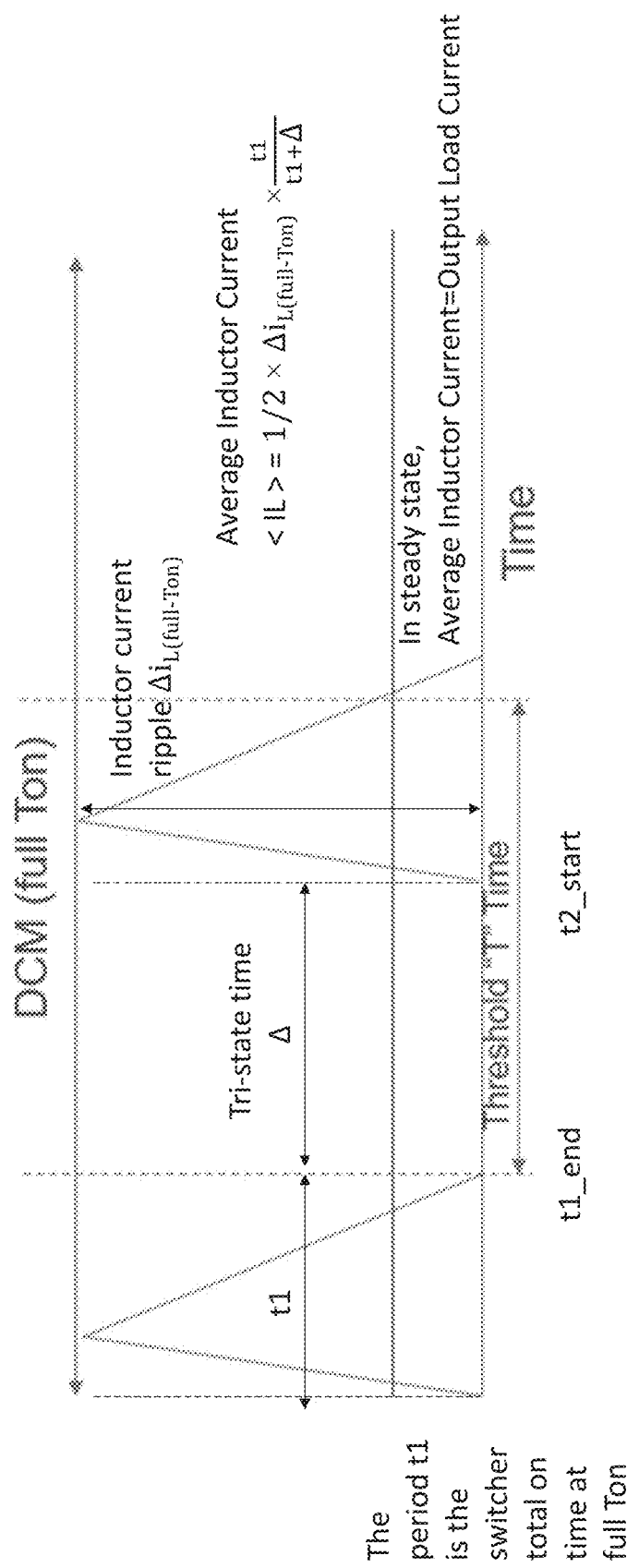
FIG. 7A is a plot showing successive inductor pulses in DCM mode.

FIG. 7A is a plot showing successive inductor pulses in DCM mode. The duration Δ between successive pulses is calculated between an end of the first pulse (t1_end) and a start of the second pulse (t2_start). In this example the second pulse occurs within the predetermined wait time T, as a result the on-time Ton remains at its full value (full Ton).

During DCM operation with full Ton, the average inductor current <IL> could be calculated as, $$\text{Average Inductor Current} = \frac{1/2 \times \Delta i_{L(full\_Ton)} \times t1}{t1 + \Delta}$$

In which, the inductor ripple current $\Delta i_L$ at full Ton (peak to peak amplitude of the inductor current pulse) can be calculated based on the topology of the buck regulator as $\Delta i_L = (Vin - Vout) \times Ton/L$ in which Vin is input voltage, Vout is output voltage, Ton is the high side power switch on time, L is the inductance; and t1 is the full Ton switcher total on time (Ton+Toff, Ton is high side on time, Toff is the low side on time). The time Ton+Toff equals to the full Ton switching period in CCM, which also equates to $1/F_{sw(full\ Ton,\ CCM)}$, in which $F_{sw(full\ Ton,\ CCM)}$ is the switching frequency at full Ton in CCM.

In steady state, the average inductor current equates to the output load current, therefore the relationship between the tri-state period Δ and $I_{Load}$ can be expressed as $$I_{Load} = \frac{1/2 \times \Delta i_{L(full\_Ton)} \times t1}{t1 + \Delta}$$

Or equivalently as, $$\Delta = \frac{1/2 \times \Delta i_{L(full\_Ton)} \times t1}{I_{Load}} - t1$$

Figure 7B:
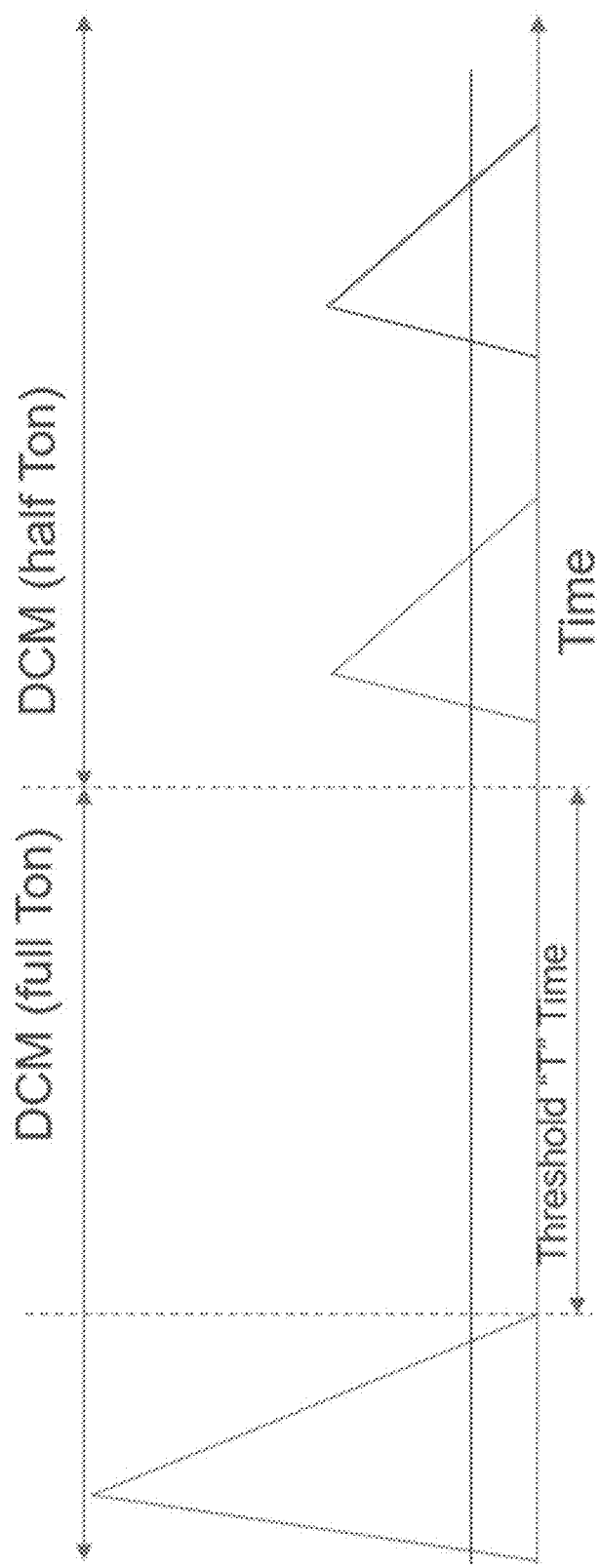
FIG. 7B is another plot showing successive inductor pulses in DCM mode.

FIG. 7B is another plot showing successive inductor pulses in DCM mode. In this example the second pulse occurs after time T has elapsed, therefore the system moves into reduced Ton mode (half Ton) whilst still in DCM operation.

Figure 7C:
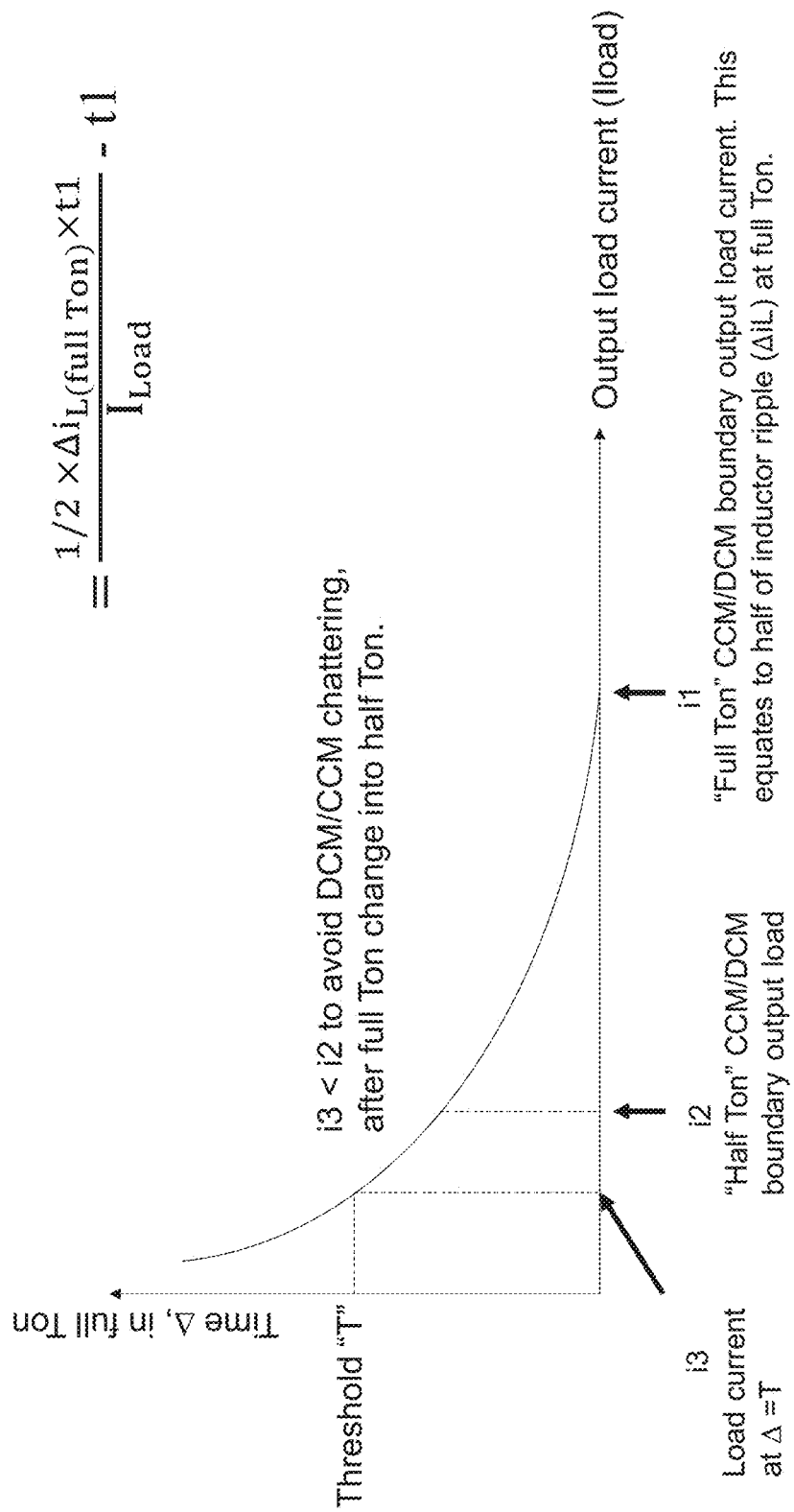
FIG. 7C is a plot illustrating a method for determining the wait time T.

FIG. 7C is a plot of the tri-state period as a function of the output load current when the device operates at full Ton. As described above the tri state period "Δ" is expressed as $$\Delta = \frac{1/2 \times \Delta i_{L(full\_Ton)} \times t1}{I_{Load}} - t1$$

This relation can be used to determine Δ, and T in full Ton state. It can also be used to determine the DCM/CCM boundary condition and select an appropriate value for the wait time T.

When the load current is at the value i1, "Δ=0". This is the boundary condition between DCM and CCM. The load current i1 at full ton CCM/DCM boundary may be expressed as: $i1 = \frac{1}{2} \Delta i_L(\text{full-Ton})$. The load current i2 at half ton CCM/DCM boundary may be expressed as: $i2 = \frac{1}{2} \Delta iL$ (half-Ton). (It will be appreciated that for the half Ton chart (not shown), the wait time Δ at i2 is zero, however in the full Ton chart of FIG. 7C it is a none zero value.)

Since $\Delta i_{L(half-Ton)} = \frac{1}{2}\Delta i_{L(full-Ton)}$, $i2 = \frac{1}{4}\Delta i_{L(full-Ton)}$. The load current i3 at the threshold time T could be calculated as, $i3 = \frac{1}{2} \times \Delta i_{L(full-Ton)} \times t1/(t1+T)$. In which, t1 is the full Ton switcher total on time. To avoid DCM to CCM chattering after full Ton change into half Ton, the threshold time T should be designed such that i3<i2. With equations above, T>t1 (or equivalently as $T > 1/F_{sw(full\ Ton,\ CCM)}$). For instance T could be selected as 4×t1 (or equivalently as $T > 4/F_{sw(full\ Ton,\ CCM)}$).

Figure 8:
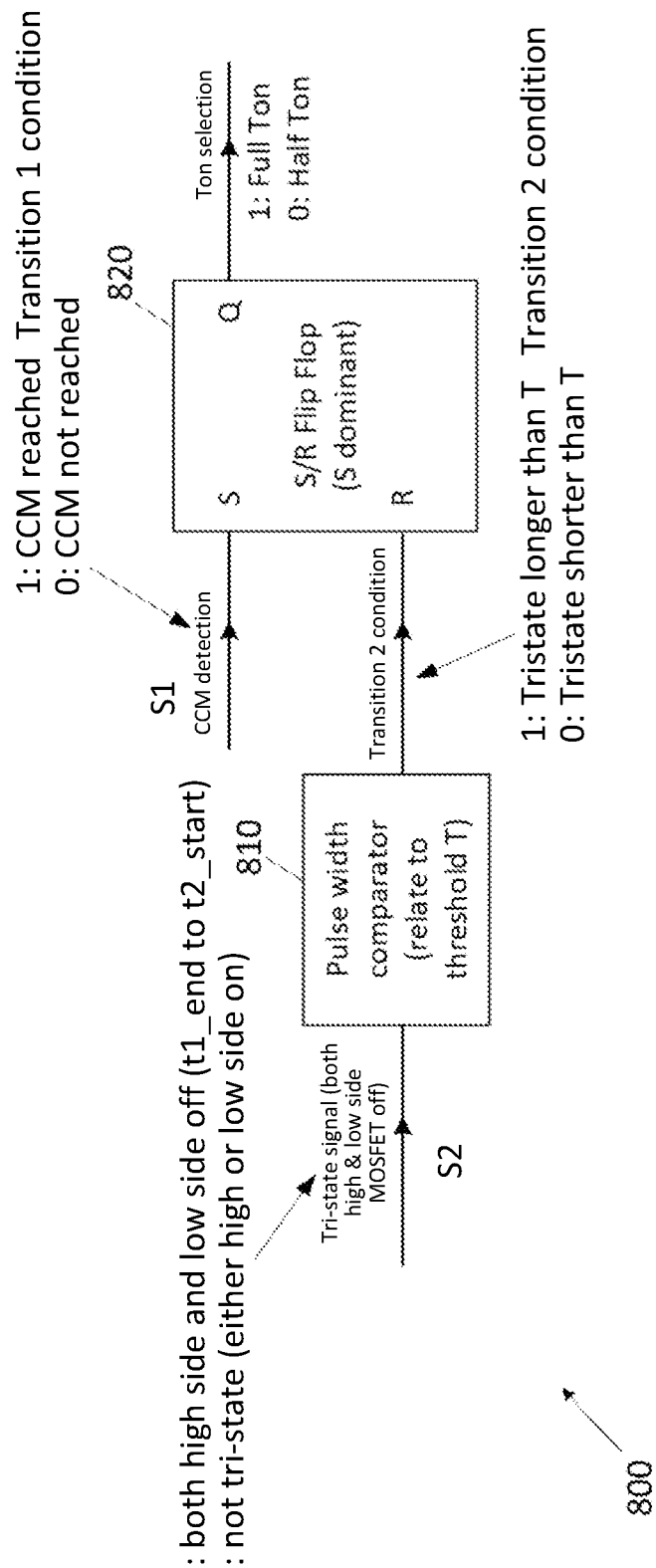
FIG. 8 is an example implementation of the controller of FIG. 5.

FIG. 8 is an example implementation of the controller 540 of FIG. 5. The controller 800 is used to determine the value of Ton for the regulator.

The controller 800 includes a pulse width comparator 810 coupled to a memory device such as a flip-flop 820. The pulse width comparator 810 has an input for receiving the logic signal S2 (tri-state signal) and an output for providing a condition signal. The logic signal S2 is high when the HS and LS power switches are both off in DCM, or low when either the HS or LS power switch is on. The condition signal is high when the tristate is longer than the wait time T or low when the tri-state is equal or shorter than T.

The flip-flop 820 has a first input (Set input S) for receiving the logic signal S1, a second input (Reset input) for receiving the condition signal from the comparator 810 and an output Q for providing a Ton selection signal. In this example the SR flip-flop 820 is S dominant.

The logic signal S1 is high when the CCM conditions is reached or low when the CCM condition is not reached. The CCM condition may be determined when two inductor pulses touch each other or when the valley of the inductor pulse does not reach zero.

The logic signal S1 may be generated using a D flip-flop having a data input (D) for receiving a positive inductor current through the low side power switch (from ground to Lx), a clock input for receiving a clock signal, and an output (Q) for providing the logic signal S1. The D flip flop will trigger on the rising edge of the clock signal. The clock signal may be driven by an inverted LS power switch signal so that at LS on to off transition the clock signal is on rising edge. Such a circuit may be built into the driver 530. A sampling of the low side FET current may be performed at the end of the inductor pulse (time t1_end as shown in FIG. 7A). If the inductor current is positive, then the circuit is operating in CCM. A threshold slightly above zero current may be used to make the system immune to noise.

The logic S2 may be generated by identifying when the HS power switch and LS power switch are both off during DCM operation.

The pulse width comparator 810 may include a capacitor coupled to a current source, and a comparator. The signal S2 may be used as an enable signal to charge the capacitor with a constant current, so the capacitor voltage would be proportional to the time. The comparator can then compare the capacitor volage with the voltage corresponding to the wait time T. When S2 is zero, the capacitor reset, and the capacitor voltage is zero. Alternatively the pulse width comparator may be replaced by a digital counter.

Figure 9A:
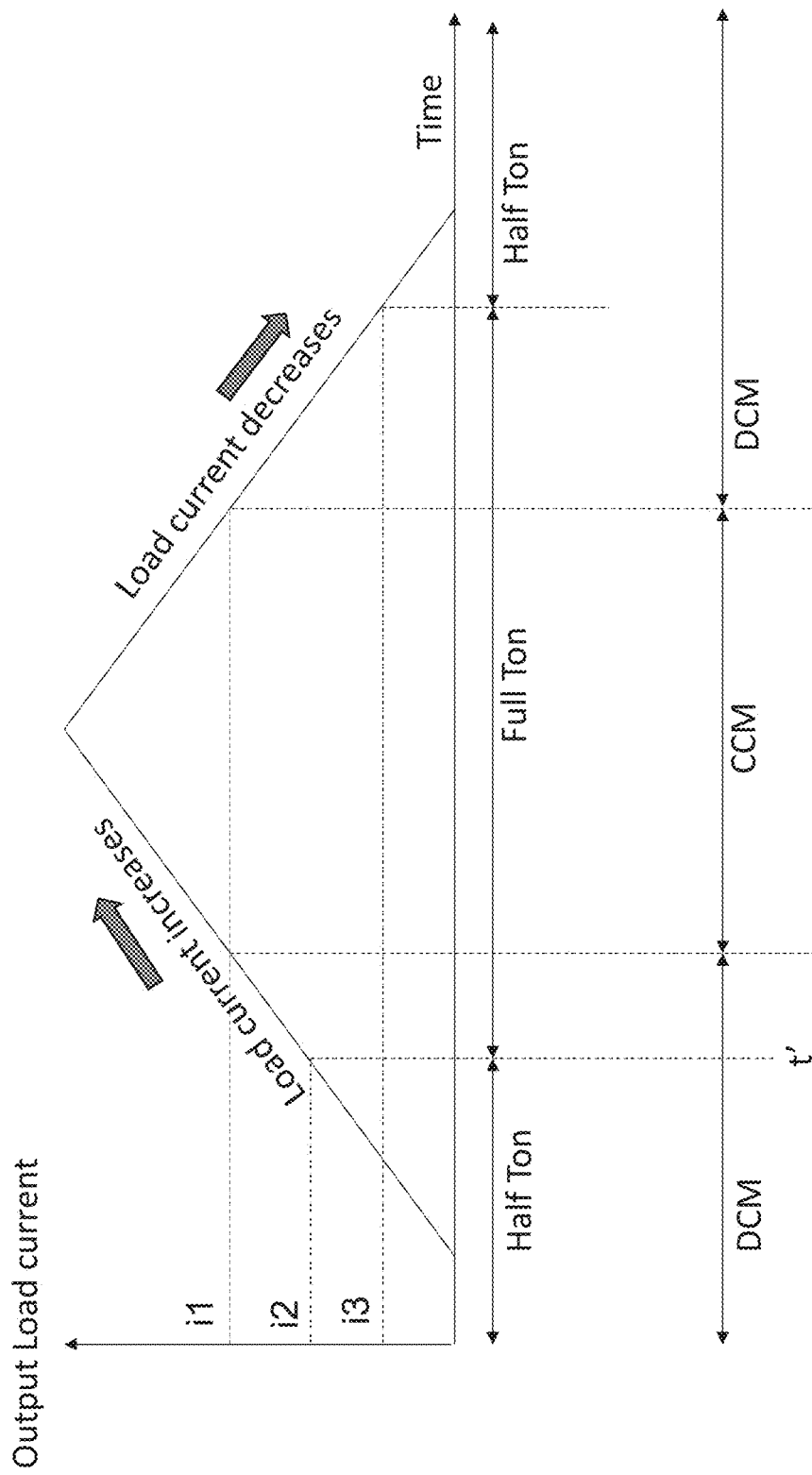
FIG. 9A is a plot representing the output load current as a function of time.

FIG. 9A is a plot representing the output load current as a function of time. The load currents i1, i2 and i3 have been defined above with reference to FIG. 7C. The load current i1>i2>i3. As the load current increases from zero to i2, the regulator operates in DCM with half Ton. At i2 (corresponding to time t') the regulator starts operating in CCM with half Ton, and transits into DCM at full Ton. This transition is illustrated in FIG. 4 of the proposed method (dash line) showing the regulator operating in one pulse of CCM at half Ton, then changing to full Ton in DCM. As the load current increases from i2 to i1, the regulator stays at full Ton and in DCM. Above i1 the regulator starts operating in CCM with full Ton. Eventually the load current reaches its maximum and starts decreasing. When the load current is below i1, it operates in DCM with full Ton. When the load current reach i3 the regulator operates with DCM with half Ton.

Figure 9B:
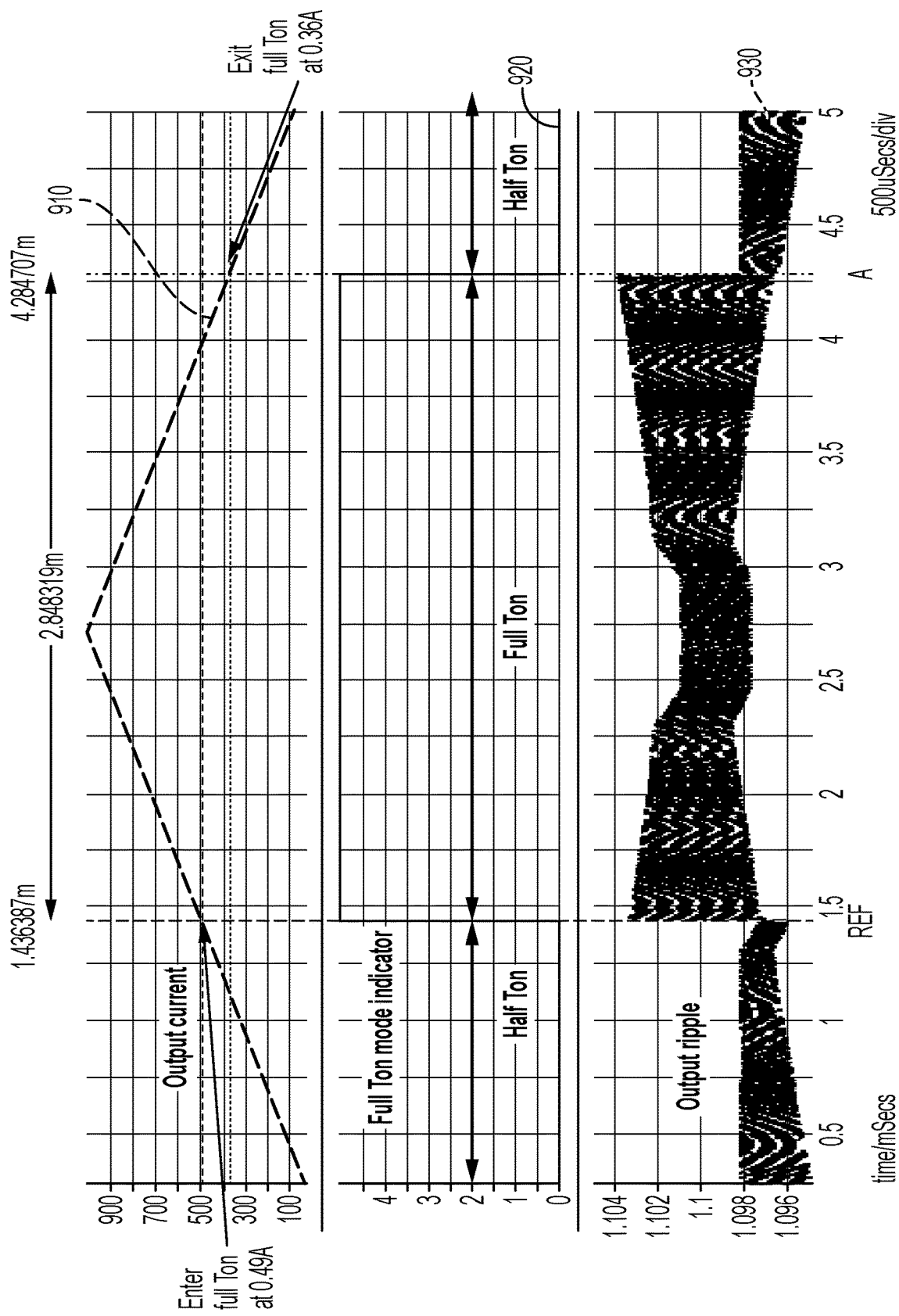
FIG. 9B is a plot showing the simulation results of the controller of FIG. 8 implemented as part of the regulator of FIG. 5.

FIG. 9B is a plot showing the simulation results of the controller of FIG. 8 implemented as part of the regulator of FIG. 5. The first waveform 910 shows the output current of the regulator. The second waveform 920 shows the on time which may be either full Ton of half Ton (in the FIG. 1 indicates full Ton and 0 indicates half Ton). The third waveform 930 shows the output ripple of the regulator. The output current increases from 0 A to 0.49 A, this phase is a light-load condition so the controller 800 keeps the regulator using a reduced Ton value (half Ton) and the regulator is operating in DCM. At 0.49 A (=i2), the current moves from light-load to higher-load and the controller 800 reaches CCM in half Ton, and transit into full Ton thereafter. The current continues to increase, and the regulator keeps using maximum Ton, after some time the current decreases again. As the load current decreases, it reduces to below the CCM/DCM boundary and the regulator start operating in DCM again using full Ton at the start. Once the output current decreases below a value of 0.36 A (=i3), the controller 800 switches back into the reduced Ton value for the light-load current. In this example, there is a hysteresis of 128 mA between when the controller 800 tells the regulator to use the maximum Ton value. It is this hysteresis that ensures there is no chattering between the DCM and CCM modes of operation. The waveform 920 indicates whether the regulator is using a reduced or a maximum value of Ton. The points where the waveform 920 switches from reduced Ton to full Ton and vice versa match with the points in 910 when the output current exceeds 0.49 A or falls below 0.36 A.

Figure 10A:
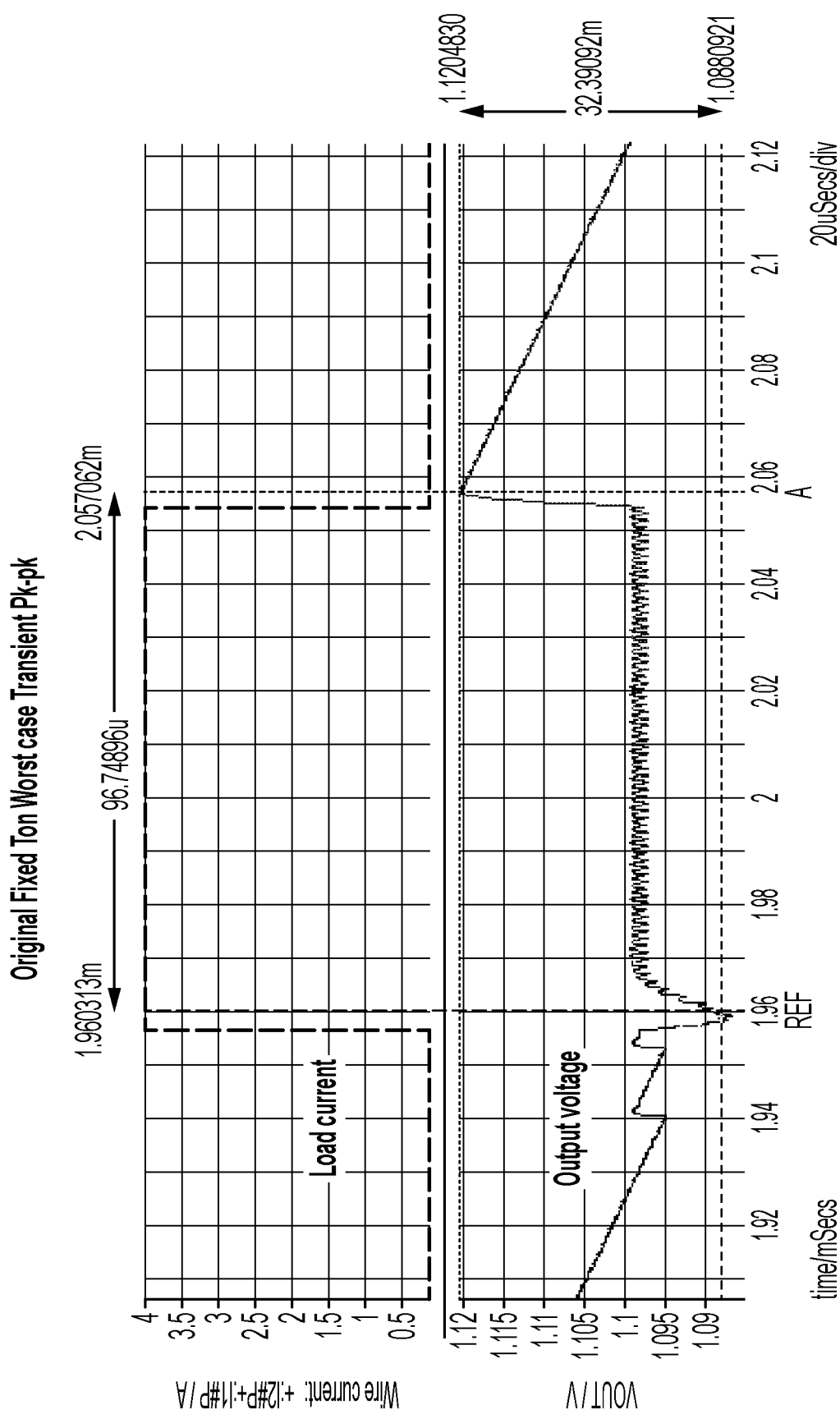
FIG. 10A is a simulation of a transient response obtained using the circuit of FIG. 1.
Figure 10B:
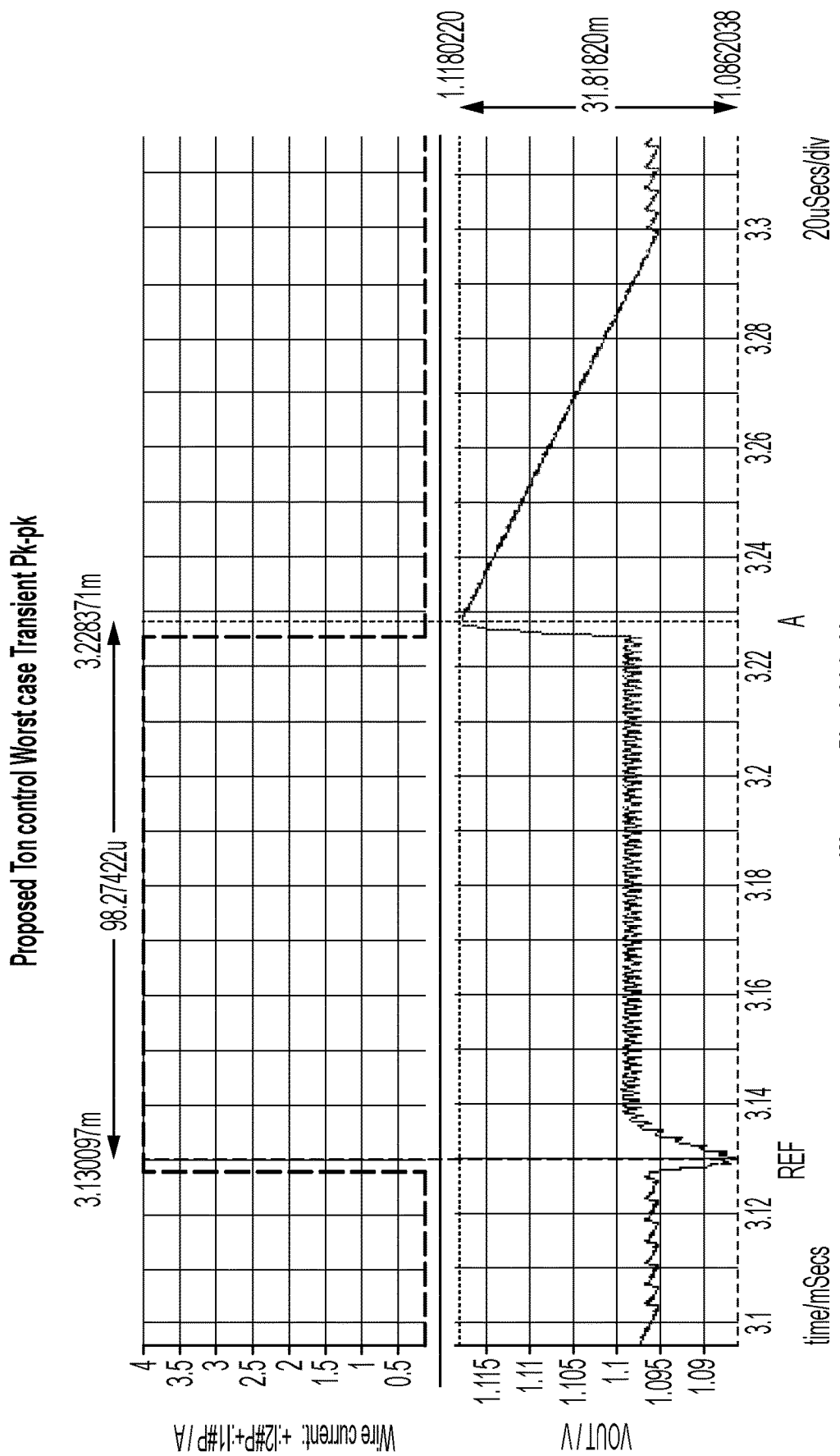
FIG. 10B is a simulation of a transient response obtained using the circuit of FIG. 5.

FIG. 10A is a simulation of a transient response obtained using the circuit of FIG. 1. FIG. 10B is a simulation of a transient response obtained using the circuit of FIG. 5. The load transient is simulated at the same test conditions: (0.1 A to 4 A in 100 ns), Vin=5V, Vout=1.1 V, 750 kHz (full Ton), Cout=3×47 µF+30×10 µF, same ramp injection setting. The worst case pk-pk transient response is almost identical between the original fixed Ton of FIG. 1 and the proposed adjust Ton control approach of FIG. 5.

A skilled person will appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A method of controlling a switching converter comprising an inductor and a power switch, the method comprising:
    generating a pulsed signal to switch the power switch, wherein the pulsed signal has an on-time adjustable between a first value and a second value, the first value being shorter than the second value;
    identifying a mode of operation between a continuous conduction mode and a discontinuous conduction mode;
    when a continuous conduction mode is identified, setting the on time to the second value;
    measuring a duration between successive inductor current pulses and comparing the duration with a first threshold value;
    maintaining the on time to the second value as long as the duration is less than the first threshold value; and
    setting the on time to the first value when the duration increases above the first threshold value.

2. The method as claimed in claim 1, wherein identifying a mode of operation comprises sensing a valley inductor current value, and wherein when the valley inductor current is positive the continuous conduction mode is identified and when the valley inductor current is zero a discontinuous conduction mode is identified.

3. The method as claimed in claim 1, wherein identifying a mode of operation comprises:
    comparing the duration between successive inductor current pulses with a second threshold value; and
    identifying the continuous conduction mode when the duration reaches a value that is less than the second threshold value.

4. The method as claimed in claim 3, wherein the second threshold value is less than 100 nanoseconds.

5. The method as claimed in claim 1, wherein the first threshold value is greater than a switch period equal to a sum of the on time and the off time of the power switch.

6. The method as claimed in claim 5, wherein the switch period is calculated with the on-time having the second value.

7. The method as claimed in claim 1, wherein the first value of the on time is half the second value.

8. The method as claimed in claim 1, wherein the duration between successive pulses is calculated between an end of a first pulse and a start of a second pulse.

9. A switching converter comprising:
    an inductor coupled to a power switch;
    a pulse generator adapted to generate a pulsed signal to switch the power switch, wherein the pulsed signal has an on-time adjustable between a first value and a second value, the first value being shorter than the second value; and
    a controller configured to:
        identify a mode of operation between a continuous conduction mode and a discontinuous conduction mode;
        set the on time to the second value when a continuous conduction mode is identified;
        measure a duration between successive inductor current pulses and compare the duration with a first threshold value;
        maintain the on time to the second value as long as the duration is less than the first threshold value; and
        set the on time to the first value when the duration increases above the first threshold value.

10. The switching converter as claimed in claim 9, wherein the converter is adapted to generate a first logic signal indicative of a continuous conduction mode condition, and a second logic signal indicative of a tri state phase.

11. The switching converter as claimed in claim 10, wherein the tri state phase occurs in discontinuous conduction mode when a high side power switch and a low side power switch of the switching converter are both switched off.

12. The switching converter as claimed in claim 11, wherein the controller comprises a pulse width comparator adapted to receive the second logic signal and to generate a condition signal, wherein when the tri state phase is greater than the first threshold value, the condition signal is in a first state, and when the tri state phase is less than the first threshold value, the condition signal is in a second state.

13. The switching converter as claimed in claim 12, wherein the controller comprises a memory device coupled to the pulse width comparator, the memory device having a first input for receiving the first logic signal, a second input for receiving the condition signal and an output for providing a selection signal to select the first value or the second value of the on time.

14. The switching converter as claimed in claim 9, wherein the switching converter is a buck converter or a boost converter.

15. The switching converter as claimed in claim 9, wherein the switching converter is a constant on time converter.

* * * * *